United States Patent [19]
Rautschek et al.

[11] Patent Number: 5,674,938
[45] Date of Patent: Oct. 7, 1997

[54] LIQUID POLYSILOXANES

[75] Inventors: Holger Rautschek, Nuenchritz; Rosemarie Guehne, Radebeul; Harald Schickmann, Meissen, all of Germany

[73] Assignee: Huels Silicone GmbH, Nuenchritz, Germany

[21] Appl. No.: 358,583

[22] Filed: Dec. 13, 1994

[30] Foreign Application Priority Data

Dec. 27, 1993 [DE] Germany .............. 43 44 663.9

[51] Int. Cl.$^6$ .................................................. C08K 3/00
[52] U.S. Cl. .................. 524/847; 524/860; 524/863; 528/23; 528/32; 528/33; 528/37; 528/40
[58] Field of Search ............................ 524/860, 847, 524/863; 528/23, 32, 33, 37, 40

[56] References Cited

U.S. PATENT DOCUMENTS 4,639,489  1/1987  Aizawa et al. .................. 524/588

FOREIGN PATENT DOCUMENTS

| | | |
|---|---|---|
| 0 163 398 | 12/1985 | European Pat. Off. . |
| 0 270 273 | 6/1988 | European Pat. Off. . |
| 0 661 329 | 7/1995 | European Pat. Off. . |
| 2 396 577 | 2/1979 | France . |

*Primary Examiner*—Karen A. Dean
*Attorney, Agent, or Firm*—Oblon, Spivak, McClelland, Maier & Neustadt, P.C.

[57] ABSTRACT

Liquid polysiloxanes are used in defoamant preparations, as diffusion-resistant plasticizer oils, separation agents, or impregnation agents. The liquid polysiloxanes are obtained by reacting:

(1) 100 parts by weight of the hydrolysis product of dimethyldichlorosilane having a viscosity of less than 200 mm$^2$/sec at 25° C.;

(2) 1–100 parts by weight of a polydiorganosiloxane having a viscosity of less than 200 mm$^2$/sec at 25° C., of formula (I)

$$R^3{}_c SiO_{(4-c)/2}, \qquad (I)$$

where each $R^3$ is independently a substituted or unsubstituted hydrocarbon group with 1–30 carbon atoms, and c has mean value 1.9–3.0; and (3) 0.1–20 parts by weight of one or more compounds (a)–(d), where (a) is a silicon compound of formula (II)

$$R^4{}_d SiX_{(4-d)}, \qquad (II)$$

where $R^4$ is a substituted or unsubstituted hydrocarbon group with 1–10 carbon atoms,
X is a hydrolyzable group, and
d is a number between 0 and 1;

(b) is a partial hydrolyzate of (a);

(c) is a silicone resin comprised essentially of units of $(CH_3)_3 SiO_{1/2}$ and $SiO_2$, in a ratio in the range of 2:1 to 1:2; and (d) is a pyrogenic or precipitated hydrophilic silicic acid with a BET surface area of 50–400 m$^2$/g; in the presence of a catalytically effective amount of a catalyst which accelerates the reaction of compounds (1)–(3).

14 Claims, No Drawings

LIQUID POLYSILOXANES

BACKGROUND OF THE INVENTION

1. Field of the Invention

The invention relates to liquid polysiloxanes and to manufacture of the same. Liquid polysiloxanes are preferred as defoamant preparations, as diffusion-resistant plasticizer oils, as release agents, and as impregnation agents.

2. Discussion of the Background

Polyorganosiloxanes include trifunctional and tetrafunctional siloxane units as well as monofunctional and difunctional siloxane units and are the subjects of numerous inventions. The most prevalent area of application for this type of polysiloxanes is in defoamant preparations. U.S. Pat. No. 4,145,308 describes a defoamant preparation which contains a copolymer having $(CH_3)_3SiO_{1/2}$ units and $SiO_2$ units in addition to a polydiorganosiloxane and silicic acid.

European Patent No. 163,541 teaches the manufacture of a defoamant preparation with improved long-term action, by catalytic reaction of trimethylsiloxy-terminated polydimethylsiloxanes, hydroxyl terminated polydimethylsiloxanes, an alkoxysilane or siloxane, or a copolymer having units of $(CH_3)_3SiO_{1/2}$ and $SiO_2$, as well as a filler, in the presence of a catalyst. Bases or organometallic compounds are mentioned as catalysts. Silicic acid is used as a filler, made hydrophobic as described in German Patent No. 56,762. The total reaction time at 120°–180° C. is more than 4 hours. European Patent No. 270,273 concerns an analogous method.

The manufacture of a defoamant by mixing hydrophobic silicic acid with a polysiloxane produced by alkali-catalyzed reaction of trimethylsilyl-terminated polydimethylsiloxanes, hydroxyl-terminated polydimethylsiloxanes, and a copolymer having units of $(CH_3)_3SiO_{1/2}$ and $SiO_2$, is described in European Patent No. 217,501. This is intended to provide a defoamant having improved effectiveness at high concentrations of anionic surfactants.

Liquid polysiloxanes are preferred for use as defoamants. All known methods of manufacturing liquid polysiloxanes use high molecular weight polysiloxanes as starting materials. These high molecular weight siloxanes must be produced from low molecular weight siloxanes (which themselves are produced by hydrolysis of methylchlorosilanes). The use of the high molecular weight polysiloxanes thus necessitates an additional step.

SUMMARY OF THE INVENTION

Accordingly, one object of the present invention is to provide liquid polysiloxanes and a method of producing the same which is more efficient and effective, without the use of compounds which must be prepared by additional polymerization and polycondensation processes. A further object is to provide liquid polysiloxanes which are outstanding for use in defoamant preparations.

These and other objects are achieved by the invention in which the following are reacted:

(1) 100 parts by weight of the hydrolysis product of dimethyldichlorosilane having a viscosity less than 200 mm²/sec, preferably less than 100 mm²/sec, at 25° C.;

(2) 1–100 parts by weight of a polydiorganosiloxane having a viscosity less than 200 mm²/sec, preferably less than 50 mm²/sec, at 25° C., and having formula (I)

$$R^3{}_cSiO_{(4-c)/2}, \qquad (I)$$

where each $R^3$ is identical or different, substituted and/or unsubstituted hydrocarbon groups with 1–30 carbon atoms, and c has a mean value of 1.9–3.0; and (3) 0.1–20 parts by weight of one or more of compounds (a)–(d), where (a) is a silicon compound of formula (II)

$$R^4{}_dSiX_{(4-d)}, \qquad (II)$$

where $R^4$ is a substituted and/or unsubstituted hydrocarbon group with 1–10 carbon atoms,
X is a hydrolyzable group, and
d is a number between 0 and 1;

(b) is a partial hydrolyzate of (a);

(c) is a silicone resin comprised essentially of units of $(CH_3)_3SiO_{1/2}$ and $SiO_2$, in a ratio in the range of 2:1 to 1:2; and (d) is a hydrophilic silicic acid, pyrogenic or precipitated, with a BET surface area of 50–400 m²/g; in the presence of a catalytically effective amount of a catalyst which accelerates the reaction of compounds (1)–(3).

DETAILED DESCRIPTION OF THE PREFERRED EMBODIMENTS

Preferred compounds (1) are the cyclic portion of the hydrolysis product of dimethyldichlorosilane, of formula (III)

$$((CH_3)_2SiO)_m, \qquad (III)$$

where m is a number from 3–12; the linear portion of the hydrolysis product of dimethyldichlorosilane, of formula (IV)

$$HO(Si(CH_3)_2O)_nH \qquad (IV)$$

having a viscosity of 20–200 mm²/sec at 25° C.; or a mixture of these linear and cyclic portions.

A preferred compound (2) is a trimethylsiloxy-terminated polydimethylsiloxane, particularly having a viscosity less than 50 mm²/sec at 25° C., e.g. hexamethyl disiloxane. Trimethylsiloxy-terminated polydimethylsiloxanes of high viscosity do not contribute any advantages because they must be added in relatively high amounts to ensure the same ratio of monofunctional to difunctional units.

Whereas polydimethylsiloxanes are preferred as compound (2), it is advantageous in some embodiments for some of the methyl groups to be replaced by other organic groups, e.g. unsubstituted alkyl groups with 2–10 carbon atoms or substituted alkyl groups, such as alkyl groups substituted with halogen, alkoxy (preferably $C_{1-10}$ alkoxy) and alkoxyalkyl (preferably $C_{1-10}$ alkoxy-$C_{1-10}$-alkyl) groups, perfluoropropyl groups or polyetherpropyl groups. Such substituted groups are particularly advantageous if the inventive polysiloxane comes into contact during use with substances or workpieces which are subsequently to be glued or painted.

Preferred compounds (3) are silicon compounds of formula (II) where X is $C_{1-4}$ alkoxy, halogen, $C_{2-10}$ acyloxy or $C_{3-10}$ oximo, e.g. tetrachlorosilane, methyltrichlorosilane, tetraethoxysilane, methyltriethoxysilane, methyltrimethoxysilane, vinyltrimethoxysilane, octyltriethoxysilane, methacrylpropyl triethoxysilane, glycidoxypropyltriethoxysilane, aminopropyltriethoxysilane, methyltriacetoxysilane, methyltributanonoximosilane or a mixture thereof, and other compounds known to one skilled in the art.

Also advantageous is the use of partial hydrolyzates of these organosilicon compounds. The degree of hydrolysis of the organosilicon compound will generally range from 0 to 90%. Suitable methods of hydrolysis are well known in the art. For example, reaction of the organosilicon compounds with water, optionally in the presence of a hydrolysis catalyst such as acids or bases is sufficient to effect hydrolysis. The organosilicon compounds may be contacted by water in the form of water vapor or by the direct addition of water or aqueous alcohol.

It is also possible to use silicone resins comprised essentially of units of $(CH_3)_3SiO_{1/2}$ and $SiO_2$ in a ratio 2:1 to 1:2. These resins may also contain silicon-bound hydroxyl and/or alkoxy (preferably $C_{1-10}$ alkoxy) groups. Such products are known to one skilled in the art as "QM resins". A certain amount of units of $(CH_3)_2SiO_{2/2}$ or $CH_3SiO_{3/2}$ can be tolerated in these resins without problem.

The use of pyrogenic or precipitated amorphous hydrophilic silicic acids as reaction partners is also possible.

The reaction of compounds (1)–(3) is carried out in the presence of catalysts which accelerate the polycondensation, polymerization, and/or equilibration of polysiloxanes. Typical examples of suitable catalysts are sodium hydroxide, potassium hydroxide, sodium- or potassium siloxanolates, tetraalkylammonium- or tetraalkylphosphonium siloxanolates, sulfuric acid, acid ion exchangers, organometallic compounds, trifluoromethanesulfonic acid, and phosphoronitrile chloride.

Preferred catalysts are phosphoronitrile halides of the formula (V)

(V)

where X and Y are halogens;

M is an element with an electronegativity of 1.0–2.2 on the Pauling scale;

R is a hydrocarbon group with 1–10 carbon atoms;

e is a number from 1 to 6;

w is the valence or oxidation state of M; and f is a number from 0 to (w–1).

Ordinarily X and Y are chlorine, M is phosphorus, e is a number between 1 and 3, and f=0.

One may also use as catalysts, with good results, reaction products of phosphoronitrile chloride with compounds of general formula (VI)

(VI)

where the R groups are independently the same or different monovalent, saturated or unsaturated hydrocarbon groups with 1–6 carbon atoms or hydrogen, with the proviso that only one hydrogen atom may be bound to each silicon atom; and m is a number from 0 to 100. Readily volatile chlorosilicon compounds which form during the reaction can be partially or completely removed in order to reduce the chlorine content of the catalyst.

The compound of formula (VI) which is employed can be produced, e.g., generally by the method of German Patent No. 4,323,183. For tris(triorganosilyl)phosphate, i.e. the case of m=0, one reacts a triorganohalosilane, e.g. trimethylchlorosilane or dimethylvinylchlorosilane, with orthophosphoric acid, in equivalent amounts, wherewith any water contained in the orthophosphoric acid is bound by the triorganohalosilane. To produce a compound with m>0, with m potentially having either a fractional or an integer value, i.e. the case of tris(triorganosiloxypolydiorganosiloxanyl) phosphate, the tris(triorganosilyl)phosphate product just mentioned is reacted with one or more organocyclosiloxanes of general formula

where each R is independently saturated or unsaturated monovalent hydrocarbon group with 1–6 carbon atoms; and a is a number from 3 to 6. Other known methods may be used as well to produce compounds of formula (VI).

One or more catalysts may be used. Thus, it is possible to mix the compounds (1)–(3) and to start the condensation reaction at room temperature with an organometallic compound. In this connection the use of silanes of general formula (II) as compound (3) is particularly advantageous. After a reaction time in which predominantly the heterocondensation of the SiOH groups of compound (1) with the SiX groups of compound (3) takes place, a condensation catalyst is added which brings about the polycondensation of compound (1) and an equilibration of compound (2). An example is potassium silanolate.

The sequence in which the individual compounds are intermixed and then reacted is arbitrary. For example, it is possible to mix the given compounds (1)–(3), heat them to the given temperature, and then add the catalyst.

The reaction may be carried out as a continuous or discontinuous process. The reaction temperature and the pressure prevailing during the reaction depend on the types and compositions of the compounds used. In general, the reaction is carried out at about 50°–200° C., preferably 70°–150° C., and at pressures of 0.1 kPa to ambient pressure (1 atm), preferably 1–10 kPa. Low molecular weight by-products may be removed during the reaction step.

The catalyst is generally used in amounts ranging from about 1 part per million (ppm) to about 2% by weight. When using phosphorous nitrile chloride or its reaction products, 1–50 ppm with respect to phosphorous nitrile chloride is preferably used.

The reaction time in a discontinuous process is several (e.g., about 3) minutes to a few (e.g., about 10) hours. Short reaction times can be achieved in a continuous reaction, e.g. in a thin-layer evaporator. In this connection, it is particularly preferred to employ the linear portion of the hydrolysis product of dimethylchlorosilane as compound (1), in combination with a catalyst containing phosphorus and nitrogen (e.g. phosphoronitrile chloride).

After completion of the reaction, ordinarily with viscosity remaining constant, the catalyst is deactivated with the aid of known neutralization agents and methods. Thus, basic catalysts can be neutralized with, e.g., phosphoric acid, silicic acid, or tris(trimethylsilyl)phosphate, and acid catalysts can be neutralized with, e.g., tertiary amines, such as triisooctylamine. Tetraalkylphosphonium- and tetraalkylammonium silanolates may be deactivated by heating.

The preferred phosphorus- and nitrogen-containing catalysts can be neutralized by amines, preferably tertiary amines with long (5–20 carbon atoms) alkyl groups, aminosilanes or aminosiloxanes, epoxides, vinyl ethers, alkyllithiums, and/or alkali-silanolates and alkali-siloxanolates.

After the catalyst has been neutralized it may be advantageous to remove the last traces of volatile compounds from the inventive liquid polysiloxanes, e.g. by further heating at reduced pressure.

The inventive liquid polysiloxanes can be manufactured from economical raw materials. Because low molecular weight siloxanes can be used, the additional step of producing relatively high molecular weight compounds as starting materials is obviated. Because of the use of low molecular weight starting materials, the inventive polysiloxanes often contain branches, which result in excellent stability of the detergency of the defoamants prepared with the inventive polysiloxanes, when such defoamants are used in detergents.

A preferred area of application of the inventive liquid polysiloxanes is in defoamant preparations. Such preparations are produced by mixing hydrophobic finely divided solids (e.g. aluminum oxide, silicon dioxide, polytetrafluoroethylene (PTFE), or polyurethane) into the inventive polysiloxanes by known methods. It is particularly preferred to use ordinary commercially available hydrophobic silicic acid (produced by pyrogenic means or by precipitation) having a BET surface area of about 50–400 m²/g.

A variant method of producing defoamant preparations using the inventive liquid polysiloxanes involves making hydrophilic silicic acid hydrophobic in situ. A mixture of the inventive liquid polysiloxanes and hydrophilic silicic acid is heated with stirring at temperatures of 100°–200° C. for a period of up to several hours. During the process, additional liquid silanes or siloxanes are added to make the silicic acid hydrophobic. The reaction can be assisted with catalysts, e.g. potassium silanolate. Catalysts used for producing the inventive liquid polysiloxanes may be reused for this purpose without prior neutralization or deactivation. For example, when basic catalysts are used for the in situ hydrophobization in manufacturing the inventive liquid polysiloxanes in the presence of the preferred phosphorus- and nitrogen-containing catalyst, one need not first deactivate the phosphorus- and nitrogen-containing catalyst. The proportion of hydrophobic or in-situ-hydrophobized silicic acid in the defoamants is about 1–20 wt. %, preferably 2–12 wt. %. The defoamant preparation may comprise the liquid polysiloxane and an organic solvent.

Further, to achieve special properties in applications of the inventive liquid polysiloxanes, one may add additional known substances to the defoamant preparations, which added substances may comprise, e.g., QM resins, linear or cyclic siloxanes of viscosity ranging from 0.65 mm²/sec to several (e.g., about 5) million mm²/sec at 25° C., polyether-modified polysiloxanes, fatty alcohols, waxes, mineral oils, fatty oils, fatty acids, organic solvents and/or surfactants.

Defoamants produced from the inventive polysiloxanes are particularly useful where foaming problems arise in, for example, conveying and processing of crude oil,
waste water treatment,
the chemical industry,
manufacturing and processing of foodstuffs and pharmaceuticals,
cleaning processes, and
detergent applications.

The defoamants may be used as 100% by weight components or may be a solution in an organic solvent, generally at concentrations of about 0.1–10% by weight, for applications in non-aqueous systems, e.g. in crude oil. For antifoaming action in aqueous systems it is preferred that the defoamants be used in emulsion form. In addition, self-emulsifying formulations, e.g. for the application in liquid laundry detergents or formulations in granular form, e.g. for the use in powder detergents, may contain defoamants based on the inventive polysiloxanes. The production of emulsions and self-emulsifying or pulverulent defoamant formulations is within the state of the art and can be accomplished in known fashion. The low viscosities achievable in the inventive polysiloxanes turn out to be advantageous in producing emulsions.

A preferred defoaming formulation is prepared by combining 1–99% by weight of the liquid polysiloxane of the invention prepared as described above, 1–20% by weight of silica gel, including hydrophilic, hydrophobic, precipitated and/or pyrogenic silica gel, with the balance up to 100% by weight of additives selected from the group of QM-resins, linear or cyclic siloxanes with a viscosity of 0.65 to about 5 million mm²/s at 25° C., polyether-modified polysiloxanes, fatty alcohols, waxes, mineral oils, fatty oils, fatty acids, surfactants and mixtures thereof.

The inventive liquid polysiloxanes may also be used for other applications, e.g. as diffusion-resistant plasticizer oils, as crosslinking agents for condensation-crosslinking and addition-crosslinking silicone rubbers (depending on the functional groups borne by these silanes and siloxanes), as release agents, or as impregnation agents.

Other features of the invention will become apparent in the course of the following descriptions of exemplary embodiments which are given for illustration of the invention and are not intended to be limiting thereof.

EXAMPLES

Examples 1–6

100 parts by weight of the linear portion of the hydrolysis product of dimethyldichlorosilane (oligomeric alpha,omega-dihydroxymethylsiloxane) having a viscosity 70 mm²/sec at 25° C., 20 parts by weight of a trimethylsilyl-terminated oligodimethylsiloxane having a viscosity 50 mm²/sec, and a quantity of different siloxanes as compound (3) were heated to 100° C. At this temperature 10 ppm phosphoronitrile chloride (produced from 1 mol ammonium chloride and 2 mol phosphorus pentachloride, generally by the method of U.S. Pat. No. 3,839,388) dissolved in dichloromethane were added (concentration based on the weight of the amount of siloxanes employed). Then, the pressure was gradually reduced to 20 kPa. After 10 minutes, the catalyst was neutralized by addition of 30 ppm triisooctylamine, thereby terminating the reaction.

The amounts and types of compound (3), and the viscosities of the polysiloxanes produced, are given in Table 1.

TABLE 1

| Example No. | Amount and type of siloxane (3) (parts by weight) | Viscosity (mm²/sec at 25° C.) |
|---|---|---|
| 1 | 1 part, methyltrimethoxysilane | 2,900 |
| 2 | 2 parts methyltrimethoxysilane | 1,000 |
| 3 | 1 part, vinyl trimethoxysilane | 3,200 |
| 4 | 1 part, octyl triethoxysilane | 758 |
| 5 | 1 part, tetraethoxysilane | 3,250 |
| 6(A) | 2 parts, octyl trichlorosilane | 2,060 |

(A)0.25 parts by weight of the reaction product of 5 parts by weight phosphoronitrile chloride with 80 parts by weight of a reaction product of 1 part by weight tris(trimethylsilyl) phosphate and 9 parts by weight octamethyl cyclotetrasiloxane, dissolved in 915 parts by weight of a mixture of cyclic oligodimethylsiloxanes, was added as a catalyst. The catalyst deactivation was by 60 ppm tri-isooctylamine.

Example 7

100 parts by weight of the cyclic portion of the hydrolysis product of dimethyldichlorosilane (mixture of cyclic dimethylsiloxanes of formula (III), with m between 3 and 7), 10 parts by weight of a trimethylsiloxy-terminated oligodimethylsiloxane having a viscosity 40 mm²/sec, and 2 parts by weight methyltrimethoxysilane were heated under reflux at 130° C. After addition of 200 ppm KOH, heating was continued an additional 5 hours, and then the reaction was terminated by neutralization with 200 ppm phosphoric acid. Distillation was used to remove the volatile components.

The polysiloxane produced had a viscosity of 106 mm²/sec; the weight average of molecular weight Mw was 16,500 g. The viscosity was appreciably below the 170 mm²/sec viscosity of linear polysiloxanes of the same molecular weight.

Example 8

The procedure was analogous to that of Example 7. Tetramethylammonium silanolate was used as the catalyst instead of KOH. Catalyst deactivation was by heating 1 hour at 190° C.; then, the volatile components were removed. The polysiloxane obtained had a viscosity of 122 mm²/sec; the number weight of molecular weight Mw was 16,400 g.

Example 9

100 parts by weight of the hydrolysis product of dimethyldichlorosilane (mixture of 59 wt. % linear and 41 wt. % cyclic siloxanes), 10 parts by weight trimethylsiloxy-terminated oligodimethylsiloxane, and 2.5 parts by weight of a 60% solution, in xylene, of a methylsilicone resin having units of $(CH_3)_3SiO_{1/2}$ and $SiO_{4/2}$ in a ratio of 0.8:1, were heated to 100° C. 0.225 parts by weight of a reaction product of 2.3 parts by weight KOH and 9.7 parts by weight of a mixture of cyclic dimethylsiloxanes was used as a catalyst. After addition of the catalyst, the mixture was stirred 6 hours at 130° C. and then the reaction was terminated by addition of 0.04 parts by weight of concentrated phosphoric acid, followed by removal of the volatile components.

The resulting polydimethylsiloxane had a viscosity of 2,150 mm²/sec, and weight average of molecular weight of 91,000 g/mol. A linear polydimethylsiloxane with the same molecular weight had a viscosity greater than 10,000 mm²/sec.

Example 10

Preparation of the catalyst:

5.6 g phosphoronitrile chloride was mixed with 3.53 g tris(trimethylsilyl)phosphate and the mixture was stirred 0.5 hours at 60° C. The resulting product was mixed with 1110.9 g cyclic polydimethylsiloxanes. The prepared catalyst (ready to use) had a concentration (as the amount of phosphoronitrile chloride converted) of 0.5 wt. %.

1.4 kg/hr of a mixture of 100 parts by weight of the linear portion of the hydrolysis product of dimethyldichlorosilane (alpha,omega-dihydroxymethyl-siloxane) having a viscosity of 70 mm²/sec at 25° C., 20 parts by weight of a trimethylsilyl-terminated oligodimethylsiloxane having a viscosity of 50 mm²/sec, and 2 parts by weight methyltrimethoxysilane, were mixed with 28 ml/hr of the catalyst, and this mixture was fed continuously to a laboratory thin layer evaporator (evaporator surface 0.06 m²) at a temperature of 90° C. and a pressure of 1 kPa. Downstream of the exit screw of the laboratory thin layer evaporator, the catalyst was neutralized with 30 ppm triisooctylamine in a static mixer.

The polysiloxane produced had a viscosity of 6,900 mm²/sec.

The incorporation of tri- and tetrafunctional units was determined by gel permeation chromatography (GPC). In comparison to linear products, the chromatograms had a broader molecular weight distribution, with shoulder formations and a higher weight average of molecular weight Mw.

Example 11

Preparation of the catalyst:

5.6 g phosphoronitrile chloride was mixed with 2.24 g tris(trimethylsilyl)phosphate and the mixture was stirred for 0.5 hours at 60° C. Then 1.3 g trimethylchlorosilane was distilled off at 12 mbar and 60° C. The product was mixed with 113.5 g cyclic polydimethylsiloxanes. The prepared catalyst (ready to use) had a concentration (as the amount of phosphoronitrile chloride converted) of 0.5 wt. %.

400 parts by weight of the non-volatile portion of the hydrolysis product of dimethyldichlorosilane, 40 parts by weight of a trimethylsiloxy-terminated oligodimethylsiloxane having a viscosity of 40 mm²/sec, 4 parts by weight methyltrimethoxysilane, and 1 part of the catalyst were heated to 100° C. The pressure was reduced to 35 mbar over the course of 20 min. Then, the catalyst was neutralized with 0.03 parts by weight triisooctylamine.

The polysiloxane obtained had a viscosity of 19,000 mm²/sec.

Use of the Polysiloxanes as defoamants:

10 g hydrophobic filled silicic acid with a BET surface area of 90 m²/g was mixed into 190 g of the inventive polysiloxane for 30 minutes using a high speed stirrer at 1900 rpm.

Testing of the defoamants:

Test A:

Test A describes the effectiveness of the defoamants in the presence of strongly foaming anionic surfactants.

In a 1 L tall beaker, 300 mL of a 0.1% sodium dodecyl sulfate solution was foamed 3 minutes at 25°±1° C. using a cage stirrer at 1300 rpm. After 1 minute standing time, the foam height $H_A$ was measured. Then, 10 mg of the defoamant being tested, dissolved in 1 mL butanone, was added, followed by 1 minute stirring, 1 minute standing, and measurement of the residual foam height $H_E$.

The degree of defoaming, as a measure of the effectiveness of the defoamant, was calculated as follows:

$$E\ (\%)=100 \cdot (H_A - H_E) \div H_A.$$

Test B:

Test B describes the effectiveness of the defoamant in the presence of high concentrations of nonionic surfactants.

In a 1 L tall beaker, 300 mL of a 4% aqueous decaoxyethylenetridecyl alcohol solution was foamed 3 minutes at 25°±1° C. using a cage stirrer at 1300 rpm. After 1 minute standing time the foam height $H_0$ was measured. Then 10 mg of the defoamant being tested, dissolved in 1 mL butanone, was added, followed by 1 minute stirring, and measurement of the foam height $H_1$. Over the next 10 minute the residual foam heights ($H_2$–$H_{10}$) were measured at 1 minute intervals.

The foam height vs. time was plotted and the area under the curve, $I_E$, was computed (integral of foam height over time). The test was repeated without the defoamant, giving $I_A$, the integral of foam height over time.

The degree of defoaming, as a measure of the effectiveness of the defoamant, was calculated as follows:

$$E\ (\%)=100 \cdot (I_A - I_E) \div I_A.$$

The results are presented in Table 2.

TABLE 2

| Example No. | Test A | Test A after 8 weeks | Test B |
|---|---|---|---|
| 1 | 94 | 94 | 79 |
| 2 | 95 | 94 | 82 |
| 3 | 88 | 88 | 78 |
| 4 | 91 | 90 | 76 |
| 5 | 90 | 80 | 65 |
| 6 | 92 | 93 | 88 |
| 7 | 94 | 94 | 69 |
| 8 | 94 | 92 | 76 |
| 9 | 89 | 88 | 76 |
| 10 | 86 | 85 | 78 |
| 11 | 92 | 90 | 88 |

It is seen from Table 2 that the defoamants produced with the inventive liquid polysiloxanes are very effective.

Use of the Polysiloxanes in defoamant emulsions:

Using 3 wt. % sorbitan monostearate and 3 wt. % polyoxyethylene-(40)-stearate, an emulsion with 10 wt. % silicone was produced from the defoamant with the polysiloxane of Example 2. The preparation was tested analogously to Tests A and B, but instead of 10 mg 100% defoamant, 100 uL 10% defoamant emulsion was used, in each case.

The following results were obtained:

TABLE 3

| Test A | Test B |
| --- | --- |
| Siloxane From Ex. (2): 94 | Siloxane From Ex. (2): 95 |

This example demonstrates that the inventive liquid polysiloxanes may also be used as defoamant emulsions with good results.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A liquid polysiloxane obtained by reacting by weight thereof
    (1) 100 parts by weight of the hydrolysis product of dimethyldichlorosilane having a viscosity less than 100 mm$^2$/sec at 25° C.;
    (2) 1–100 parts by weight of a polydiorganosiloxane having a viscosity less than 200 mm$^2$/sec at 25° C. of formula (I)

$$R^3_c SiO_{(4-c)/2}, \quad (I)$$

wherein each $R^3$ is, independently, a substituted or unsubstituted hydrocarbon groups with 1–30 carbon atoms, and c has mean value 1.9–3.0; and (3) 0.1–20 parts by weight of one or more compounds (a)–(d), wherein
        (a) is a silicon compound of formula (II)

$$R^4_d SiX_{(4-d)} \quad (II)$$

wherein $R^4$ is a substituted or unsubstituted hydrocarbon group with 1–10 carbon atoms,
X is a hydrolyzable group, and
d is a number between 0 and 1;
        (b) is a partial hydrolyzate of (a);
        (c) is a silicone resin comprised essentially of units of $(CH_3)_3SiO_{1/2}$ and $SiO_2$, in a ratio in the range of 2:1 to 1:2; and
        (d) is a pyrogenic or precipitated hydrophilic silicic acid with a BET surface area of 50–400 m$^2$/g; in the presence of a catalytically effective amount of a catalyst which accelerates the reaction of compounds (1)–(3).

2. The liquid polysiloxane of claim 1, wherein said hydrolysis product (1) is the cyclic portion of the hydrolysis product of dimethyldichlorosilane, of formula (III)

$$((CH_3)_2SiO)_m \quad (III)$$

where m is a number from 3–12.

3. The liquid polysiloxane of claim 1, wherein said hydrolysis product (1) is the linear portion of the hydrolysis product of dimethyldichlorosilane, of formula (IV)

$$HO(Si(CH_3)_2O)_n H \quad (IV)$$

having a viscosity of 20 to less than 100 mm$^2$/sec at 25° C.

4. The liquid polysiloxane of claim 1, wherein said hydrolysis product (1) is a mixture of linear and cyclic portions of the hydrolysis product of dimethyldichlorosilane.

5. The liquid polysiloxane of claim 1, wherein said polydiorganosiloxane (2) has a viscosity less than 50 mm$^2$/sec at 25° C.

6. The liquid polysiloxane of claim 1, wherein said polydiorganosiloxane (2) is hexamethyldisiloxane.

7. The liquid polysiloxane of claim 1, wherein said compound (3)(a) is one or more alkyltrialkoxysilanes, tetralkoxysilanes or a mixture thereof.

8. The liquid polysiloxane of claim 1, wherein said catalyst is a phosphoronitrile halide of formula (V)

$$(PX_2=N)_e PX_3^+ (MY_{w-f+1}R_f)^- \quad (V)$$

wherein X and Y are halogens;
    M is an element with an electronegativity of 1.0–2.2 on the Pauling scale;
    R is a hydrocarbon group with 1–10 carbon atoms;
    e is a number from 1 to 6;
    w is the valence or oxidation state of M; and
    f is a number from 0 to (w–1).

9. The liquid polysiloxane of claim 8, wherein X and Y are chlorine, M is phosphorus, e is a value between 1 and 3, and f=0.

10. The liquid polysiloxane of claim 1, wherein said catalyst is the reaction product of phosphoronitrile chloride with a compound of formula (VI)

$$(R_3SiO(R_2SiO)_m)_3 P=O, \quad (VI)$$

wherein each R is, independently, a monovalent, saturated or unsaturated hydrocarbon group with 1–6 carbon atoms or hydrogen, with the proviso that only one hydrogen atom may be bound to each silicon atom; and
    m is a number from 0 to 100.

11. The liquid polysiloxane of claim 1, wherein said catalyst is the reaction product of phosphoronitrile chloride with a compound of formula (VI)

$$(R_3SiO(R_2SiO)_m)_3 P=O, \quad (VI)$$

wherein volatile chlorine-containing silicon compounds which form during the reaction are at least partially removed.

12. The liquid polysiloxane of claim 1, wherein said reacting step is carried out at a temperature of 70°–150° C. and a pressure in the range of 1000 Pa to atmospheric pressure.

13. The liquid polysiloxane of claim 1, wherein low molecular weight byproducts are removed during said reacting step.

14. A method of making the liquid polysiloxane of claim 1, wherein said reacting step is carried out in a thin layer evaporator.

* * * * *

UNITED STATES PATENT AND TRADEMARK OFFICE
CERTIFICATE OF CORRECTION

PATENT NO. : 5,674,938
DATED : OCTOBER 7, 1997
INVENTOR(S) : HOLGER RAUTSCHEK ET AL

It is certified that error appears in the above-indentified patent and that said Letters Patent is hereby corrected as shown below:

Column 8, line 38, "the next 10 minute" should read --the next 10 minutes--.

Column 10, line 14, "tetralkoxysilanes" should read --tetraalkoxysilanes--.

Signed and Sealed this

Seventh Day of July, 1998

Attest:

Attesting Officer

BRUCE LEHMAN

Commissioner of Patents and Trademarks